US012651332B2

(12) United States Patent
Yoo et al.

(10) Patent No.: US 12,651,332 B2
(45) Date of Patent: Jun. 9, 2026

(54) SELF-SUPERVISED LEARNING FOR MODELING A 3D BRAIN ANATOMICAL REPRESENTATION

(71) Applicant: Siemens Healthcare GmbH, Erlangen (DE)

(72) Inventors: Youngjin Yoo, Princeton, NJ (US); Eli Gibson, Plainsboro, NJ (US); Gengyan Zhao, Plainsboro, NJ (US); Bogdan Georgescu, Princeton, NJ (US)

(73) Assignee: Siemens Healthineers AG, Forchheim (DE)

( * ) Notice: Subject to any disclaimer, the term of this patent is extended or adjusted under 35 U.S.C. 154(b) by 496 days.

(21) Appl. No.: 17/821,511

(22) Filed: Aug. 23, 2022

(65) Prior Publication Data

US 2024/0070853 A1      Feb. 29, 2024

(51) Int. Cl.
*G06T 7/00* (2017.01)
*G06T 7/62* (2017.01)
*G06V 10/764* (2022.01)

(52) U.S. Cl.
CPC .............. *G06T 7/0012* (2013.01); *G06T 7/62* (2017.01); *G06V 10/765* (2022.01);
(Continued)

(58) Field of Classification Search
CPC . G06T 2207/20084; G06T 2207/20081; G06T 17/00; G06T 2207/10016; G06T 2207/20021; G06T 2207/30201; G06T 7/11; G06T 7/75; G06T 17/05; G06T 2200/08; G06T 7/73; G06T 2207/10028; G06N 3/045; G06N 20/10; G06N 3/006;
(Continued)

(56) References Cited

U.S. PATENT DOCUMENTS 10,665,011 B1 *   5/2020   Sunkavalli .............. G06T 15/50
2014/0254936 A1 *   9/2014   Sun .......................... G06T 9/00
                                                                    382/195
(Continued)

FOREIGN PATENT DOCUMENTS

CN        112966626 A  *  6/2021   ............. G06F 18/22
CN        114581462 A  *  6/2022   ........... G06F 18/253
WO   WO-2013073624 A1 *  5/2013   ....... G06F 17/30247
WO   WO-2019018063 A1 *  1/2019   ............... G06T 7/11

OTHER PUBLICATIONS

Huang et al., "Learning hierarchical representations for face verification with convolutional deep belief networks", IEEE Conference on Computer Vision and Pattern Recognition, 2012, 8 pgs.
(Continued)

*Primary Examiner* — Quan M Hua

(57) ABSTRACT

Systems and methods for performing a medical imaging analysis task are provided. A plurality of 3D (three dimensional) patches extracted from a 3D input medical image is received. A set of local features is extracted from each of the plurality of 3D patches using a machine learning based local feature extractor network. Global features representing relationships between the sets of local features are determined. A medical imaging analysis task is performed on the 3D input medical image based on the global features. Results of the medical imaging analysis task are output.

18 Claims, 7 Drawing Sheets

(52) U.S. Cl.
CPC ............... *G06T 2207/10028* (2013.01); *G06T 2207/20221* (2013.01); *G06T 2207/30016* (2013.01); *G06V 2201/031* (2022.01)

(58) Field of Classification Search
CPC .......... G06N 3/084; G06N 3/088; G06N 7/01; G06N 3/044; G06N 3/048; G06V 20/56; G06V 10/42; G06V 10/82; G06V 10/44; G06V 20/17
See application file for complete search history.

(56) References Cited

U.S. PATENT DOCUMENTS

| | | | | |
|---|---|---|---|---|
| 2020/0311426 A1* | 10/2020 | Charlton | ................... | G06T 7/60 |
| 2021/0150710 A1* | 5/2021 | Hosseinzadeh Taher | ................... | |
| | | | | G06V 10/764 |
| 2022/0262024 A1* | 8/2022 | Sun | ......................... | G06T 17/00 |
| 2022/0351863 A1* | 11/2022 | Wang | ..................... | G16H 50/30 |

OTHER PUBLICATIONS

Caron et al., "Unsupervised learning of visual features by contrasting cluster assignments", Advances in Neural Information Processing Systems, 2020, 22 pgs.

Chen et al., "A simple framework for contrastive learning of visual representations", International Conference on Machine Learning, 2020, 20 pgs.

Zhou et al., "Models Genesis", Medical Image Analysis, 2022, pp. 1-26.

Jun et al., "Medical Transformer: Universal Brain Encoder for 3D MRI Analysis", arXiv, 2021, 9 pgs.

Lambert et al., "Leveraging 3D information in unsupervised brain MRI segmentation", IEEE 18th International Symposium on Biomedical Imaging, 2021, 4 pgs.

Roy et al., "Are 2.5D approaches superior to 3D deep networks in whole brain segmentation?", Proceedings of Machine Learning Research, 2022, 17 pgs.

Taleb et al., "3D self-supervised methods for medical imaging", Advances in Neural Information Processing Systems, 2020, 17 pgs.

Dosovitskiy et al., "Discriminative unsupervised feature learning with convolutional neural networks", Advances in Neural Information Processing Systems, 2014, 13 pgs.

Dosovitskiy et al., "An image is worth 16×16 words: Transformers for image recognition at scale", arXiv, Computer Science, Computer Vision and Pattern Recognition, 2020, 22 pgs.

Ranftl et al., "Vision transformers for dense prediction", Proceedings of the IEEE/CVF International Conference on Computer Vision, 2021, 10 pgs.

Wu et al., "Rethinking and improving relative position encoding for vision transformer", Proceedings of the IEEE/CVF International Conference on Computer Vision, 2021, 13 pgs.

* cited by examiner

FIG 1

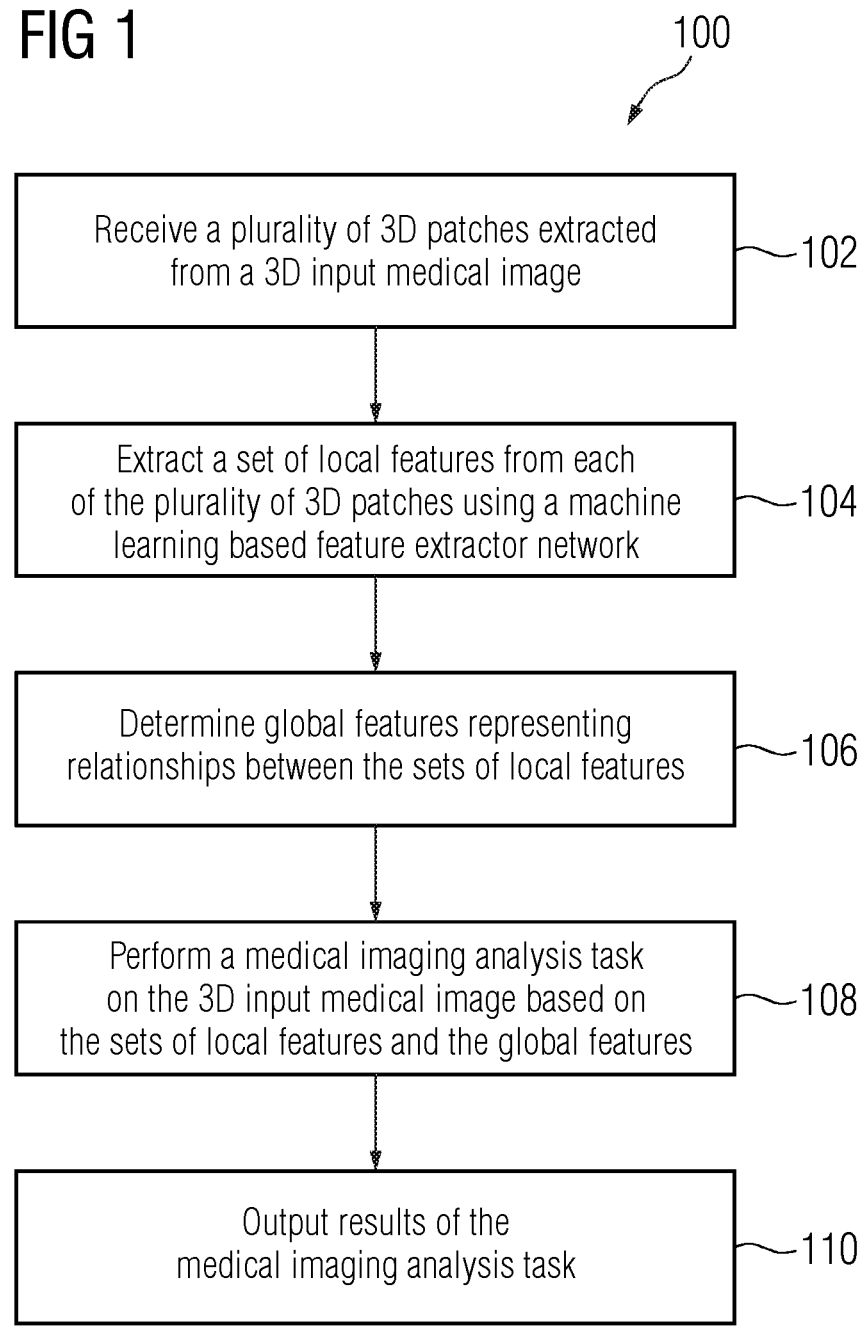

100

Receive a plurality of 3D patches extracted from a 3D input medical image — 102

Extract a set of local features from each of the plurality of 3D patches using a machine learning based feature extractor network — 104

Determine global features representing relationships between the sets of local features — 106

Perform a medical imaging analysis task on the 3D input medical image based on the sets of local features and the global features — 108

Output results of the medical imaging analysis task — 110

SELF-SUPERVISED LEARNING FOR MODELING A 3D BRAIN ANATOMICAL REPRESENTATION

TECHNICAL FIELD

The present invention relates generally to modelling a 3D (three dimensional) anatomical representation, and in particular to self-supervised learning for modeling a 3D brain anatomical representation.

BACKGROUND

Artificial intelligence and deep learning have been utilized for performing various medical imaging analysis tasks for reducing clinician workload and improving diagnostic accuracy. However, there are many unmet technical challenges in developing data-driven artificial intelligence models. Such challenges include, for example, the limited availability of training data and the difficulty in annotating the training data. Annotating the training data is an expensive, labor-intensive, and time-consuming task that has complicated regulatory issues.

Conventionally, self-supervised learning techniques have been proposed for mitigating such technical challenges. However, such conventional self-supervised learning techniques focus on modeling localized anatomical features only, modeling 2D (two dimensional) slice features, or have limited robustness to image size and field-of-view variations.

BRIEF SUMMARY OF THE INVENTION

In accordance with one or more embodiments, systems and methods for performing a medical imaging analysis task are provided. A plurality of 3D (three dimensional) patches extracted from a 3D input medical image is received. A set of local features is extracted from each of the plurality of 3D patches using a machine learning based local feature extractor network. Global features representing relationships between the sets of local features are determined. A medical imaging analysis task is performed on the 3D input medical image based on the global features. Results of the medical imaging analysis task are output.

In one embodiment, the plurality of 3D patches is of a fixed resolution and a fixed field-of-view.

In one embodiment, the sets of local features are encoded with positional information. The positional information may comprise pairwise positional relationships between the sets of local features. The global features are determined based on the positional information.

In one embodiment, the set of local features and the global features are integrated. A classification task is performed based on the set of local features integrated with the global features.

In one embodiment, the sets of local features are decoded using a machine learning based decoding network. The decoded sets of local features are combined with the global features. A segmentation task is performed based on the decoded sets of local features combined with the global features.

In one embodiment, the medical imaging analysis task comprises one of classification, detection, or segmentation.

In one embodiment, the local feature extractor network is trained with self-supervised learning.

In one embodiment, the 3D input medical image depicts a brain of a patient.

These and other advantages of the invention will be apparent to those of ordinary skill in the art by reference to the following detailed description and the accompanying drawings.

BRIEF DESCRIPTION OF THE DRAWINGS

FIG. 1 shows a method for performing a medical imaging analysis task using a joint local/global self-supervised learning system, in accordance with one or more embodiments;

DETAILED DESCRIPTION

Figure 2:
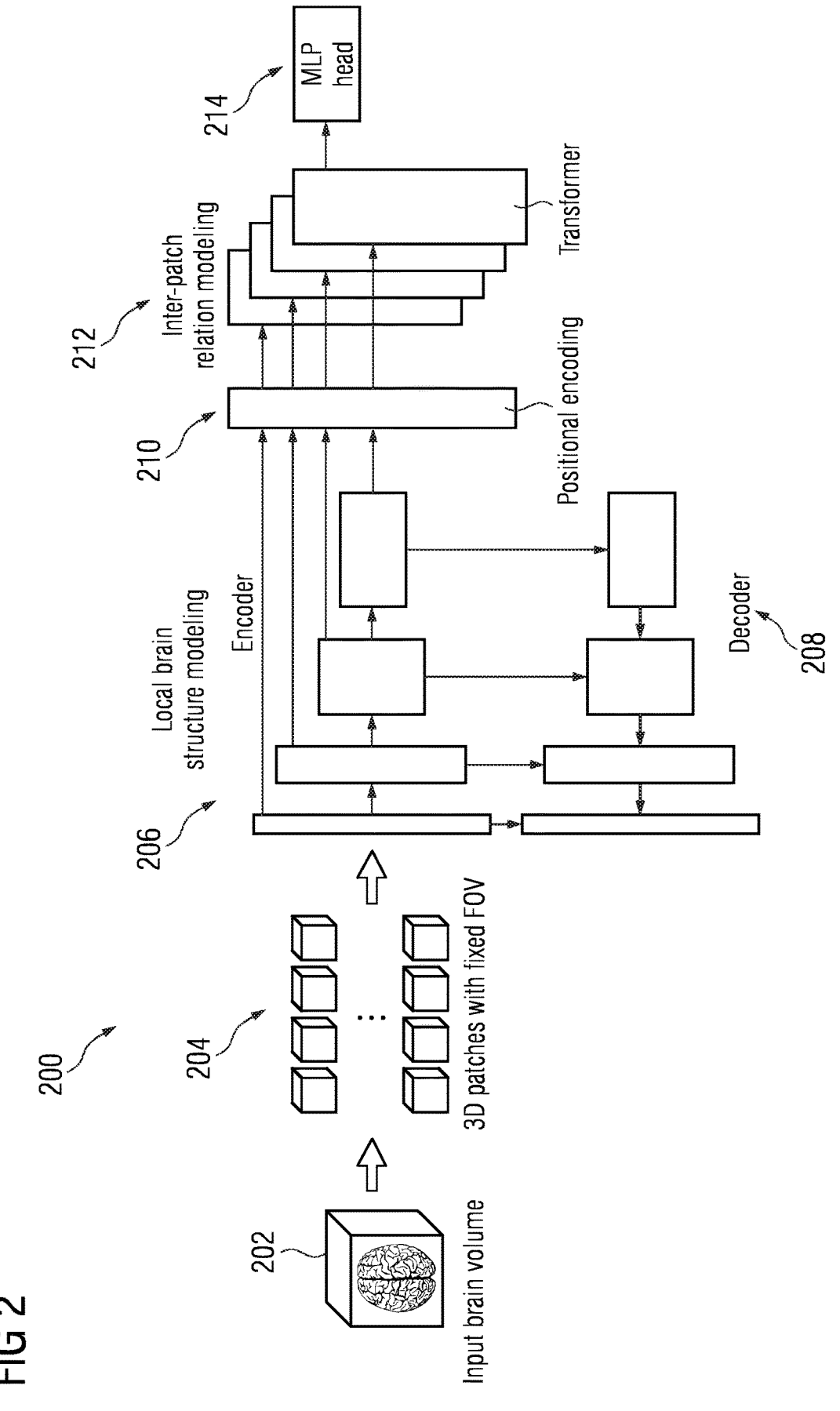
FIG. 2 shows a network architecture of a joint local/global self-supervised learning system for performing a medical imaging analysis task, in accordance with one or more embodiments.

The present invention generally relates to methods and systems for self-supervised learning for modeling a 3D brain anatomical representation. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. Embodiments disclosed herein will be described with reference to the figures, where like reference numerals represent the same or similar elements.

Embodiments described herein provide for a joint local/global self-supervised learning system that effectively models both local and global (non-local) features in 3D medical images. Such local and global features may be used for performing a downstream medical imaging analysis task, such as, e.g., classification, segmentation, detection, etc. The joint local/global self-supervised learning system is sequentially trained to optimize the local feature extraction network and to optimize the global feature extraction network, and then to fine-tune the joint local/global feature extraction networks in the context of the downstream medical imaging analysis task. Advantageously, embodiments described herein reduce the amount of annotations required in developing artificial intelligence based systems for performing medical imaging analysis tasks and improve both training speed and generalizability in developing such artificial intelligence based systems.

FIG. 1 shows a method 100 for performing a medical imaging analysis task using a joint local/global self-supervised learning system, in accordance with one or more embodiments. The steps of method 100 may be performed by one or more suitable computing devices, such as, e.g., computer 702 of FIG. 7. FIG. 2 shows a network architecture 200 of a joint local/global self-supervised learning system for performing a medical imaging analysis task, in accordance with one or more embodiments. FIG. 1 and FIG. 2 will be described together.

At step 102 of FIG. 1, a plurality of 3D (three dimensional) patches extracted from a 3D input medical image is received. In one embodiment, the 3D input medical image depicts a brain of a patient. However, the 3D input medical image may depict any anatomical object of interest of the patient, such as, e.g., organs, bones, lesions, etc. In one example, as shown in network architecture 200 of FIG. 2, the plurality of 3D patches may be 3D patches 204 extracted from input brain volume 202.

The plurality of 3D patches may be extracted from the 3D input medical image using any suitable approach. For example, the 3D patches may be randomly extracted from the 3D input medical image, may be extracted from the 3D input medical image at predetermined locations, or may be extracted from the 3D input medical image according to a predefined extraction pattern (e.g., extracting the 3D patches centered around every voxel, every 10 voxels, etc. of the 3D input medical image). In one embodiment, the plurality of 3D patches has the same fixed resolution (e.g., 10×10×10 voxels) and the same field-of-view. The resolution and field-of-view of the plurality of 3D patches may be defined based on the medical imaging analysis task to be performed (at step 108 of FIG. 1).

In one embodiment, the 3D input medical image is an MRI (magnetic resonance imaging) image or a CT (computed tomography) image. However, the 3D input medical image may be of any other suitable modality (e.g., ultrasound) or combinations of medical imaging modalities. The plurality of 3D patches may be received by loading the 3D patches from a storage or memory of a computer system or receiving the 3D patches from a remote computer system. In one embodiment, the 3D input medical image is received and the 3D patches are extracted from the 3D input medical image.

At step 104 of FIG. 1, a set of local features is extracted from each of the plurality of 3D patches using a machine learning based local feature extractor network. Each of the sets of local features comprise latent features representing the most important features in the 3D patch it is extracted from. The local features model local anatomical representations in the 3D patches.

In one example, as shown in network architecture 200 of FIG. 2, the machine learning based local feature extractor network is encoder network 206. Encoder network 206 receives as input 3D patches 204 and generates as output a set of local features for each of the 3D patches 204. Each of the sets of local features model local brain structures in the 3D patch 204 that the set of local features is extracted from. In some embodiments, decoder network 208 also decodes the sets of local features to reconstruct input 3D patches 204 to model the local features. Encoder network 206 and decoder network 208 are jointly trained during a prior offline or training stage. Encoder network 206 and decoder network 208 may be implemented as a fully convolutional network (e.g., a UNet or DenseUNET) or any other suitable machine learning based architecture (e.g., autoencoder or a variational autoencoder).

At step 106 of FIG. 1, global features representing relationships between the sets of local features are determined. The global features model global anatomical representations between the 3D patches.

In one embodiment, to determine the global features, the sets of local features are encoded with a 3D positional information using a positional encoder. In one embodiment, the positional encoder is a machine learning based positional encoding network that receives as input the sets of local features and generates as output a positional encoding matrix. The positional encoding matrix has the same dimension as the corresponding sets of local features for each layer. The positional encoding is performed by flattening or linearizing the sets of local features by a linear layer of the positional encoding network. In another embodiment, the positional encoder comprises a fixed basis function (e.g., a sine function). The linearized sets of local features are embedded or encoded with pairwise positional relationships between pairs of the sets of local features by the positional encoding network. The output of the position encoder is a combination (e.g., sum) of the sets of local features and the corresponding positional encoding matrix for each layer.

The global features are then determined based on the linearized sets of local features embedded positional encodings using a machine learning based global feature extractor network. In one embodiment, the global feature extractor network is a transformer network. The transformer network is trained to learn the interdependencies on the different levels of the local features based on the positional encodings. The global feature extractor network may be any other suitable machine learning based network.

In one example, as shown in network architecture 200 of FIG. 2, positional encoding network 210 receives as input the sets of local features output from encoder network 206 and generates as output linearized sets of local features embedded with positional encodings. Transformer network 212 receives as input the linearized sets of local features embedded with positional encodings and generates as output the global features.

At step 108 of FIG. 1, a medical imaging analysis task is performed on the 3D input medical image based on the global features. The medical imaging analysis task may be any suitable analysis task performed on the 3D input medical image, such as, e.g., segmentation, classification, detection, etc. The medical imaging analysis task may be performed using a machine learning based network. In one example, as shown in network architecture 200 of FIG. 2, the medical imaging analysis task is performed by a multilayer perceptron (MLP) 214. MLP 214 receives as input the global features and generates as output results of the medical imaging analysis task.

In one embodiment, depending on the medical imaging analysis task, the medical imaging analysis task may additionally be performed based on the sets of local features and/or based on the output of decoder 208. For instance, in one example, the sets of local features are integrated with the global features and MLP 214 generates results of the medical imaging analysis task based on the global features integrated with the sets of local features. In another example, the output of decoder 208 is combined with the global features output by transformer network 212 and MLP 214 generates results of the medical imaging analysis tasks based on the combination of the output of decoder 208 and the global features.

The configuration of network architecture 200 of FIG. 2 may be modified based on the medical imaging analysis task. For example, a network architecture configured for performing a classification task is shown in FIG. 3 and a network architecture configured for performing a segmentation task is shown in FIG. 4, both of which will be described below with continued reference to FIG. 2.

Figure 3:
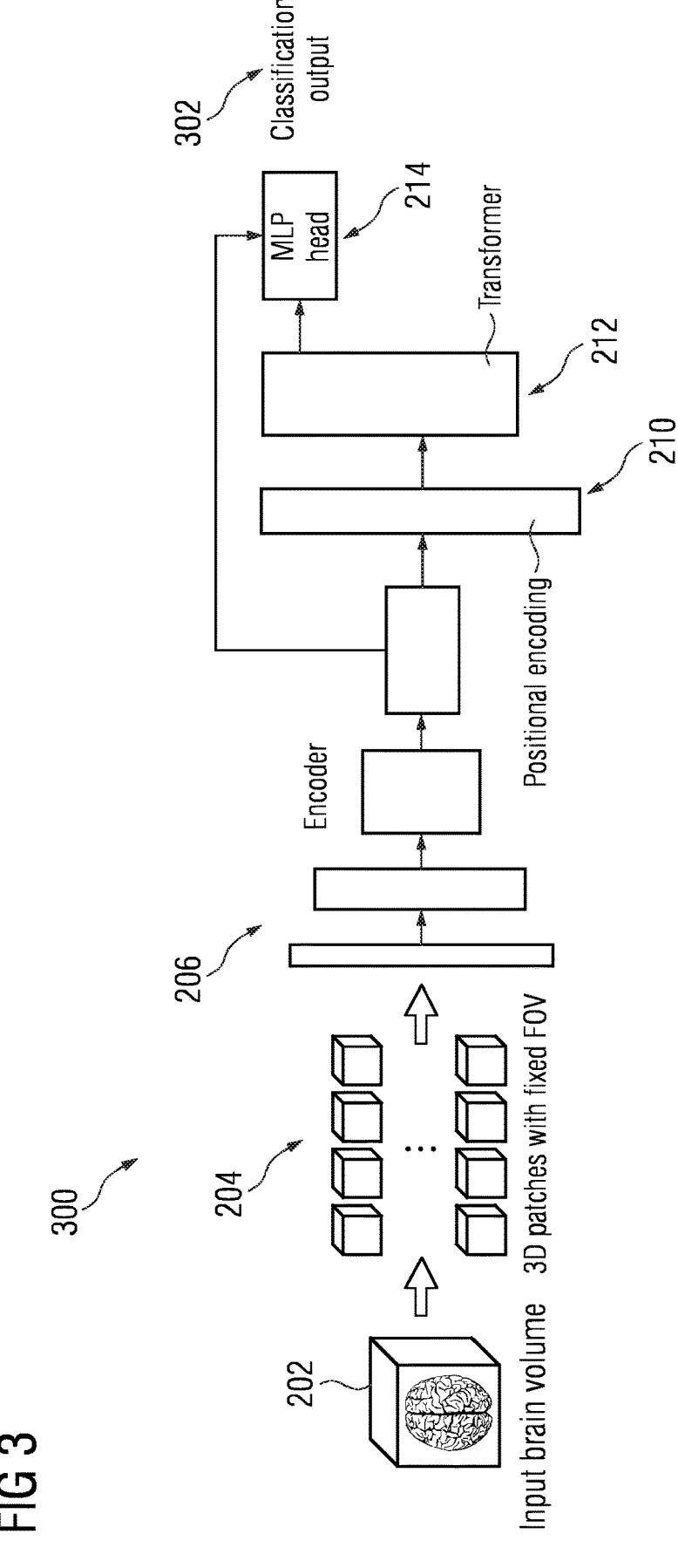
FIG. 3 shows a network architecture configured for performing a classification task, in accordance with one or more embodiments.

FIG. 3 shows a network architecture 300 configured for performing a classification task, in accordance with one or more embodiments. Network architecture 300 modifies the configuration of network architecture 200 of FIG. 2 by applying a fully connect layer in MLP head 214 to utilize both the sets of local features output by encoder 206 and the global features output by transformer network 212. Accordingly, MLP head 214 receives as input the sets of local features and the global features and generates as output classification output 302.

Figure 4:
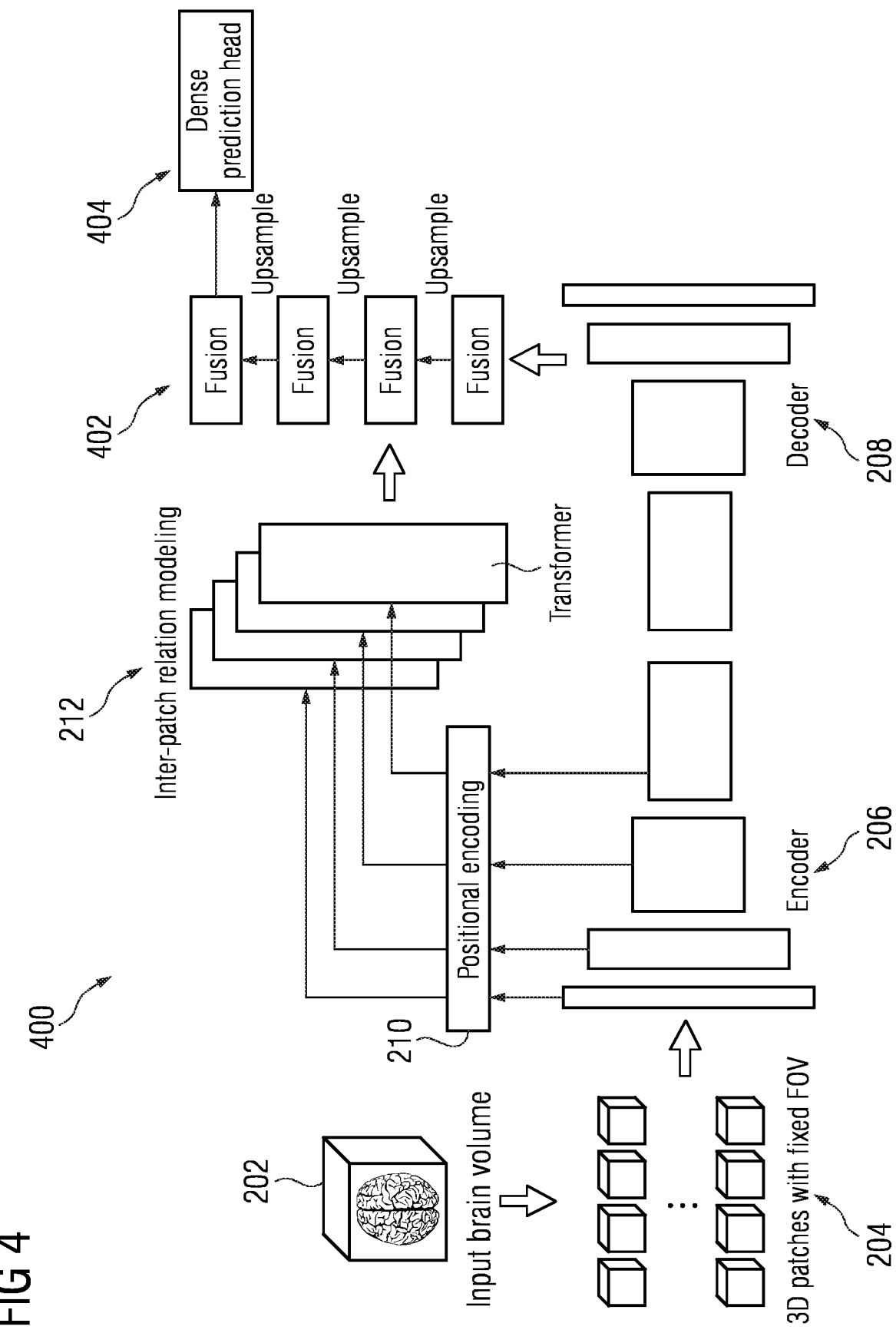
FIG. 4 shows a network architecture configured for performing a segmentation task, in accordance with one or more embodiments.

FIG. 4 shows a network architecture 400 configured for performing a segmentation task, in accordance with one or more embodiments. Network architecture 400 is configured to segment an anatomical object from input brain volume 202. In network architecture 400, decoder network 208 reconstructs the sets of local features output from the bottleneck layer (i.e., the deepest layer) of encoder network 206. Network architecture 400 modifies the configuration of network architecture 200 of FIG. 2 by combining the sets of reconstructed local features output by decoder network 208 with the global features output by transformer network 212 in a hierarchical manner to combine the local and global features at different scales. The output of transformer network 212 for each layer is a patch embedding that is mapped to a predetermined vector size by a trainable linear projection. The patch embeddings retain spatial relations between the patches. The combination is performed by fusion blocks 402 that performs vector concatenation, element-wise addition, and upsampling operations to perform the local and global feature integration at different scales. Machine learning based dense prediction head 404 receives as input the combined local and global features and generates as output results of the segmentation task (e.g., a segmentation map of an anatomical object in input brain volume 202). In one embodiment, network architecture 400 may be further configured for spatial/intensity normalization, MR bias field correction, or brain extraction.

At step 110 of FIG. 1, results of the medical imaging analysis task are output. For example, the results of the medical imaging analysis task can be output by displaying the results of the medical imaging analysis task on a display device of a computer system, storing the results of the medical imaging analysis task on a memory or storage of a computer system, or by transmitting the results of the medical imaging analysis task to a remote computer system.

The networks of network architecture 200 of FIG. 2, network architecture 300 of FIG. 3, and network architecture 400 of FIG. 4 are trained during a prior offline or training stage. During the training stage, the networks are sequentially trained to optimize the local feature extraction network, and then to optimize the global feature extraction network, and then to fine-tune the joint local/global feature extraction networks in the context of the downstream medical imaging analysis task. The training stage is split into a pretraining stage and a fine-tuning stage. Once trained, the trained network architecture 200 of FIG. 2, network architecture 300 of FIG. 3, and network architecture 400 of FIG. 4 is applied during an online or inference stage, for example, for performing method 100 of FIG. 1.

During the pretraining, the local feature extractor network (e.g., encoder 206) is pretrained (with decoder 208) in a self-supervised manner using a set of training data comprising 3D training patches with fixed resolution and fixed field-of-view. The 3D training patches may be efficiently extracted from full 3D brain images by first resampling the full 3D brain images to have a fixed resolution (e.g., 1 millimeter isotropic resolution) and fixed field-of-view. The 3D training patches may be randomly extracted from the resampled full 3D training images, may be selected from predefined locations, or may be extracted according to a predefined extraction pattern. Each 3D training patches is used to model localized hierarchical brain anatomical representations with an encoder network 206/decoder network 208 implemented with a fully convolutional network with multiple convolutional layers. Encoder network 206 and decoder network 208 may be jointly pretrained with, e.g., axial, coronal, and sagittal views to make the self-supervised learning invariant to different views and to learn universal view-invariant brain structural representations. Since the local feature extractor network (e.g., encoder network 206) and decoder network 208 in the fully convolutional network is trained with 3D training patches that have fixed field-of-views, the pretrained networks can be subsequently used for any image size and orientation. The pretraining with 3D training patches may be performed using any suitable self-supervised learning approach, such as, e.g., reconstruction training objective, contrastive learning, exemplar learning, etc.

The global feature extractor network (e.g., transformer network 212) is pretrained using 3D training images each split into a plurality of 3D training patches with fixed resolutions. Transformer network 212 is pretrained in an unsupervised manner. For example, some of the 3D training patches in each 3D training images are randomly masked out and corresponding positional encoding vectors of the masked patches are predicted by modeling global relations. In this manner, transformer network 212 is trained to learn positional anatomical relationships using only the positional encoding.

After pretraining, the local feature extractor network and the global feature extractor network are fine-tuned for the specific medical imaging analysis task with limited training data that have fewer ground truth labels or annotations. For the classification medical imaging analysis task, the output (e.g., the local features) of the pretrained encoder network 206 and the output (e.g., the global features) of the pretrained transformer network 212 are integrated by applying a fully connected layer to utilize both the top-level local and global features. For the segmentation medical imaging analysis task, the output (e.g., the local features) output from pretrained decoder network 208 and the output (e.g., the global features) output from the pretrained transformer network 212 are combined in a hierarchical manner to combine the features at different scales.

Advantageously, embodiments described herein receive local 3D patches as input to model local and global anatomical (e.g., brain) representations. The 3D patches may be of any resolution, dimension, and orientation for effectively modeling 3D anatomical structures without expert labels or annotations. Accordingly, when there is a great variety of image dimensions and orientations in the set of training data, the system does not require additional training such as, e.g., knowledge distillation, to address different image characteristics, which can accelerate the system for development for brain imaging applications. The embodiments described herein may reduce the amount of required expert labels and annotations in developing artificial intelligence systems for automated imaging tasks, and can reduce both training speed and generalizability in developing such artificial intelligence systems.

For the classification medical imaging analysis task, embodiments described herein provide spatial features output from the pretrained encoder network 206 and transformer network 212 that can be integrated to effectively use both local and global features during fine-tuning. For the segmentation medical imaging analysis task, hierarchical spatial features output from the pretrained decoder network 208 and transformer network 212 can be combined for fine-tuning to provide high-resolution and more anatomically coherent predictions.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 5:
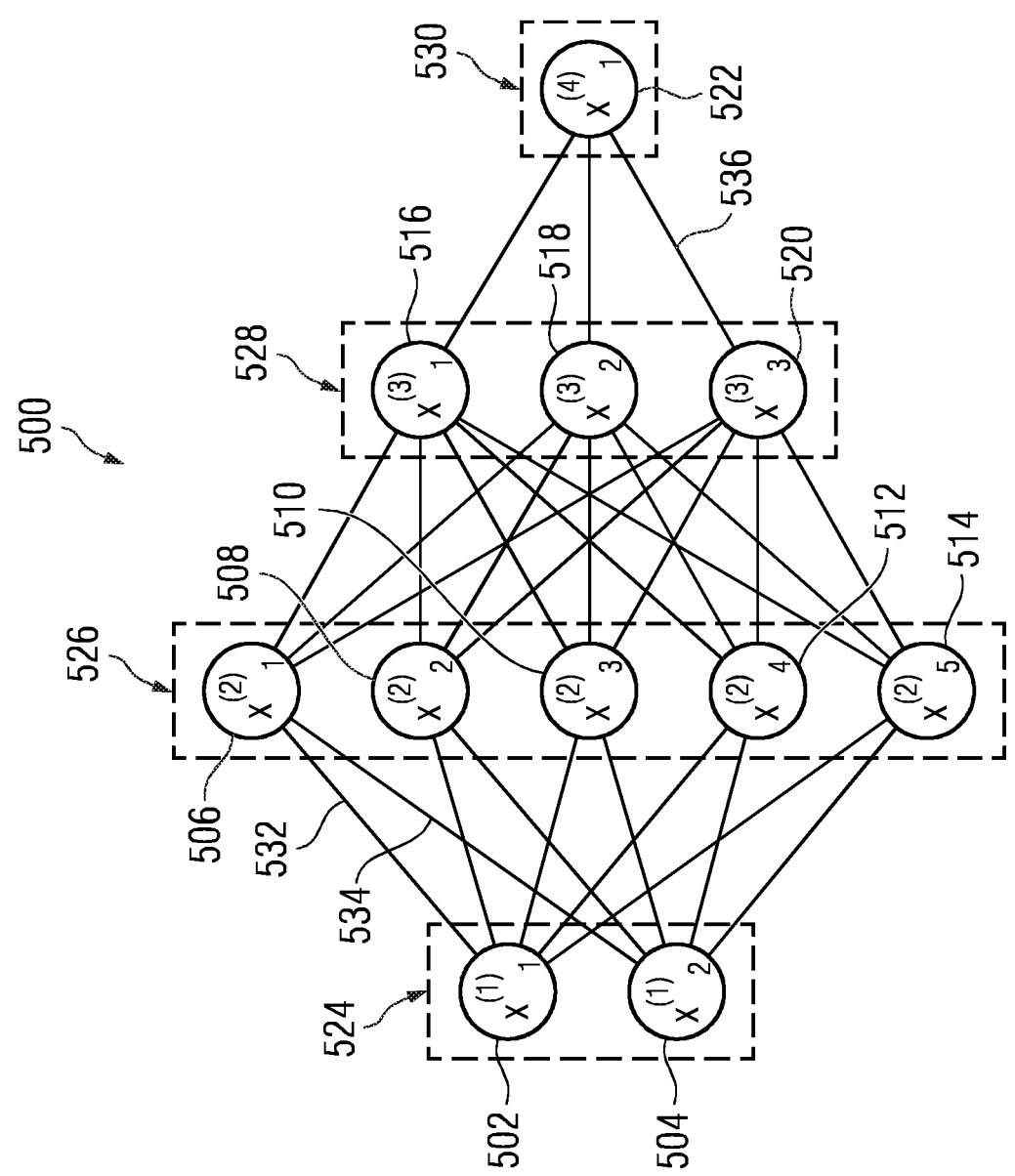
FIG. 5 shows an exemplary artificial neural network that may be used to implement one or more embodiments.

FIG. 5 shows an embodiment of an artificial neural network 500, in accordance with one or more embodiments. Alternative terms for "artificial neural network" are "neural network", "artificial neural net" or "neural net". Machine learning networks described herein, such as, e.g., the local feature extractor network utilized at step 104, the global feature extractor network utilized at step 106, and the machine learning based network utilized at step 108 of FIG. 1, encoder network 206, decoder network 208, positional encoding network 210, transformer network 212, and MLP head 214 of FIG. 2, encoder network 206, positional encoding network 210, transformer network 212, and MLP head 214 of FIG. 3, and encoder network 206, decoder network 208, positional encoding network 210, transformer network 212, and dense prediction head 404 of FIG. 4, may be implemented using artificial neural network 500.

The artificial neural network 500 comprises nodes 502-522 and edges 532, 534, . . . , 536, wherein each edge 532, 534, . . . , 536 is a directed connection from a first node 502-522 to a second node 502-522. In general, the first node 502-522 and the second node 502-522 are different nodes 502-522, it is also possible that the first node 502-522 and the second node 502-522 are identical. For example, in FIG. 5, the edge 532 is a directed connection from the node 502 to the node 506, and the edge 534 is a directed connection from the node 504 to the node 506. An edge 532, 534, . . . , 536 from a first node 502-522 to a second node 502-522 is also denoted as "ingoing edge" for the second node 502-522 and as "outgoing edge" for the first node 502-522.

In this embodiment, the nodes 502-522 of the artificial neural network 500 can be arranged in layers 524-530, wherein the layers can comprise an intrinsic order introduced by the edges 532, 534, . . . , 536 between the nodes 502-522. In particular, edges 532, 534, . . . , 536 can exist only between neighboring layers of nodes. In the embodiment shown in FIG. 5, there is an input layer 524 comprising only nodes 502 and 504 without an incoming edge, an output layer 530 comprising only node 522 without outgoing edges, and hidden layers 526, 528 in-between the input layer 524 and the output layer 530. In general, the number of hidden layers 526, 528 can be chosen arbitrarily. The number of nodes 502 and 504 within the input layer 524 usually relates to the number of input values of the neural network 500, and the number of nodes 522 within the output layer 530 usually relates to the number of output values of the neural network 500.

In particular, a (real) number can be assigned as a value to every node 502-522 of the neural network 500. Here, $x^{(n)}_i$ denotes the value of the i-th node 502-522 of the n-th layer 524-530. The values of the nodes 502-522 of the input layer 524 are equivalent to the input values of the neural network 500, the value of the node 522 of the output layer 530 is equivalent to the output value of the neural network 500. Furthermore, each edge 532, 534, . . . , 536 can comprise a weight being a real number, in particular, the weight is a real number within the interval $[-1, 1]$ or within the interval $[0, 1]$. Here, $w^{(m,n)}_{i,j}$ denotes the weight of the edge between the i-th node 502-522 of the m-th layer 524-530 and the j-th node 502-522 of the n-th layer 524-530. Furthermore, the abbreviation $w^{(n)}_{i,j}$ is defined for the weight $w^{(n,n+1)}_{i,j}$.

In particular, to calculate the output values of the neural network 500, the input values are propagated through the neural network. In particular, the values of the nodes 502-522 of the (n+1)-th layer 524-530 can be calculated based on the values of the nodes 502-522 of the n-th layer 524-530 by $$x^{(n+1)}_j = f\left(\sum_i x^{(n)}_i \cdot w^{(n)}_{i,j}\right).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 524 are given by the input of the neural network 500, wherein values of the first hidden layer 526 can be calculated based on the values of the input layer 524 of the neural network, wherein values of the second hidden layer 528 can be calculated based in the values of the first hidden layer 526, etc.

In order to set the values $w^{(m,n)}_{i,j}$ for the edges, the neural network 500 has to be trained using training data. In particular, training data comprises training input data and training output data (denoted as ti). For a training step, the neural network 500 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 500 (backpropagation algorithm). In particular, the weights are changed according to $$w^{(n)}_{i,j} = w^{(n)}_{i,j} - \gamma \cdot \delta^{(n)}_j \cdot x^{(n)}_i$$

wherein $\gamma$ is a learning rate, and the numbers $\delta^{(n)}_j$ can be recursively calculated as $$\delta^{(n)}_j = \left( \sum_k \delta^{(n+1)}_k \cdot w^{(n+1)}_{j,k} \right) \cdot f' \left( \sum_i x^{(n)}_i \cdot w^{(n)}_{i,j} \right)$$

based on $\delta^{(n+1)}_j$, if the (n+1)-th layer is not the output layer, and $$\delta^{(n)}_j = \left( x^{(n+1)}_k - t^{(n+1)}_j \right) \cdot f' \left( \sum_i x^{(n)}_i \cdot w^{(n)}_{i,j} \right)$$

if the (n+1)-th layer is the output layer 530, wherein f' is the first derivative of the activation function, and $y^{(n+1)}_j$ is the comparison training value for the j-th node of the output layer 530.

Figure 6:
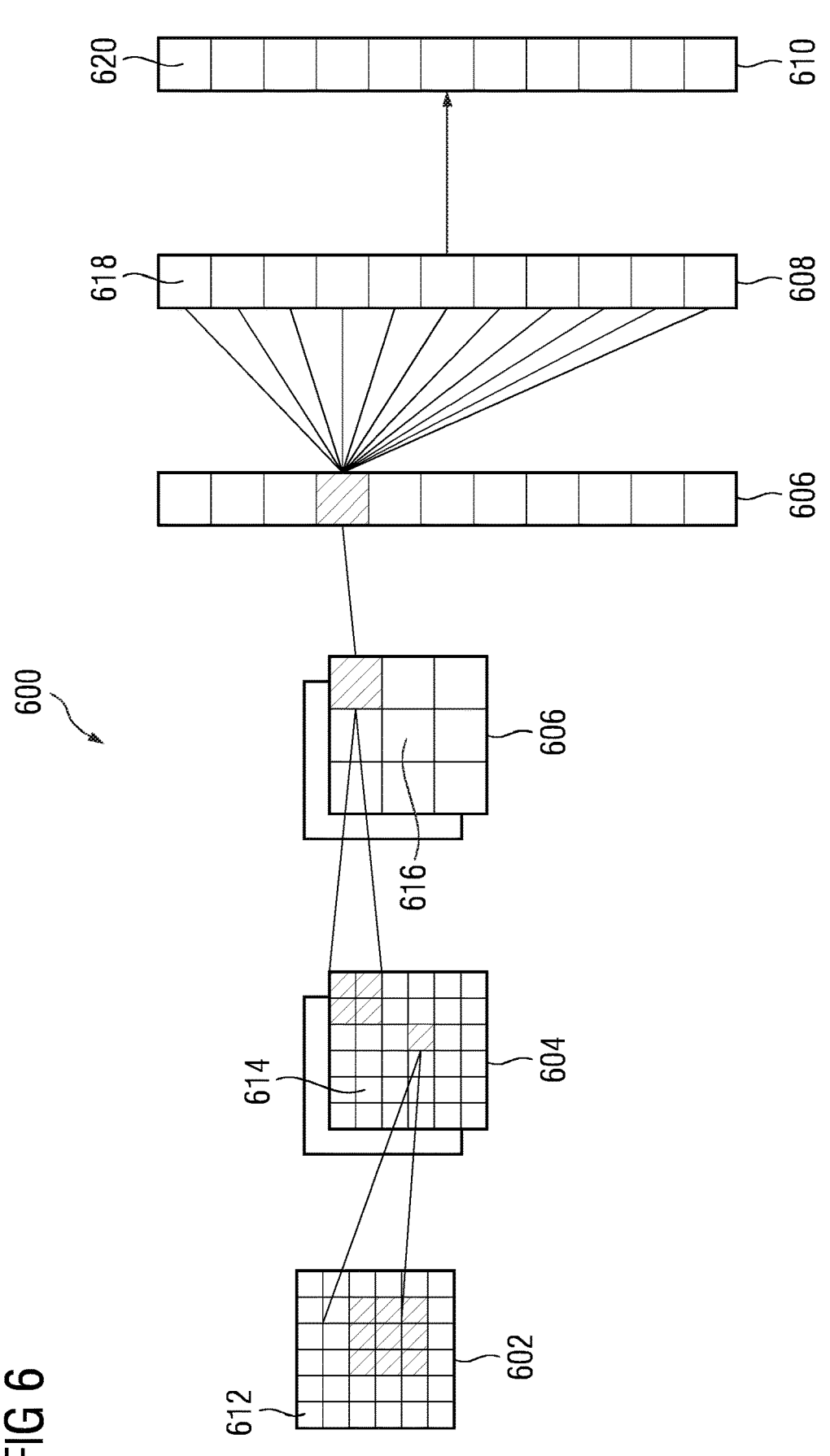
FIG. 6 shows a convolutional neural network that may be used to implement one or more embodiments.

FIG. 6 shows a convolutional neural network 600, in accordance with one or more embodiments. Machine learning networks described herein, such as, e.g., the local feature extractor network utilized at step 104, the global feature extractor network utilized at step 106, and the machine learning based network utilized at step 108 of FIG. 1, encoder network 206, decoder network 208, positional encoding network 210, transformer network 212, and MLP head 214 of FIG. 2, encoder network 206, positional encoding network 210, transformer network 212, and MLP head 214 of FIG. 3, and encoder network 206, decoder network 208, positional encoding network 210, transformer network 212, and dense prediction head 404 of FIG. 4, may be implemented using convolutional neural network 600.

In the embodiment shown in FIG. 6, the convolutional neural network comprises 600 an input layer 602, a convolutional layer 604, a pooling layer 606, a fully connected layer 608, and an output layer 610. Alternatively, the convolutional neural network 600 can comprise several convolutional layers 604, several pooling layers 606, and several fully connected layers 608, as well as other types of layers. The order of the layers can be chosen arbitrarily, usually fully connected layers 608 are used as the last layers before the output layer 610.

In particular, within a convolutional neural network 600, the nodes 612-620 of one layer 602-610 can be considered to be arranged as a d-dimensional matrix or as a d-dimensional image. In particular, in the two-dimensional case the value of the node 612-620 indexed with i and j in the n-th layer 602-610 can be denoted as $x^{(n)}_{[i, j]}$. However, the arrangement of the nodes 612-620 of one layer 602-610 does not have an effect on the calculations executed within the convolutional neural network 600 as such, since these are given solely by the structure and the weights of the edges.

In particular, a convolutional layer 604 is characterized by the structure and the weights of the incoming edges forming a convolution operation based on a certain number of kernels. In particular, the structure and the weights of the incoming edges are chosen such that the values $x^{(n)}_k$ of the nodes 614 of the convolutional layer 604 are calculated as a convolution $x^{(n)}_k = K_k * x^{(n-1)}$ based on the values $x^{(n-1)}$ of the nodes 612 of the preceding layer 602, where the convolution * is defined in the two-dimensional case as $$x^{(n)}_k[i,j] = (K_k * x^{(n-1)})[i,j] = \sum_{i'} \sum_{j'} K_k[i',j'] \cdot x^{(n-1)}[i-i', j-j'].$$

Here the k-th kernel $K_k$ is a d-dimensional matrix (in this embodiment a two-dimensional matrix), which is usually small compared to the number of nodes 612-618 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 612-620 in the respective layer 602-610. In particular, for a convolutional layer 604, the number of nodes 614 in the convolutional layer is equivalent to the number of nodes 612 in the preceding layer 602 multiplied with the number of kernels.

If the nodes 612 of the preceding layer 602 are arranged as a d-dimensional matrix, using a plurality of kernels can be interpreted as adding a further dimension (denoted as "depth" dimension), so that the nodes 614 of the convolutional layer 604 are arranged as a (d+1)-dimensional matrix. If the nodes 612 of the preceding layer 602 are already arranged as a (d+1)-dimensional matrix comprising a depth dimension, using a plurality of kernels can be interpreted as expanding along the depth dimension, so that the nodes 614 of the convolutional layer 604 are arranged also as a (d+1)-dimensional matrix, wherein the size of the (d+1)-dimensional matrix with respect to the depth dimension is by a factor of the number of kernels larger than in the preceding layer 602.

The advantage of using convolutional layers 604 is that spatially local correlation of the input data can exploited by enforcing a local connectivity pattern between nodes of adjacent layers, in particular by each node being connected to only a small region of the nodes of the preceding layer.

In embodiment shown in FIG. 6, the input layer 602 comprises 36 nodes 612, arranged as a two-dimensional 6×6 matrix. The convolutional layer 604 comprises 72 nodes 614, arranged as two two-dimensional 6×6 matrices, each of the two matrices being the result of a convolution of the values of the input layer with a kernel. Equivalently, the nodes 614 of the convolutional layer 604 can be interpreted as arranges as a three-dimensional 6×6×2 matrix, wherein the last dimension is the depth dimension.

A pooling layer 606 can be characterized by the structure and the weights of the incoming edges and the activation function of its nodes 616 forming a pooling operation based on a non-linear pooling function f. For example, in the two dimensional case the values $x^{(n)}$ of the nodes 616 of the pooling layer 606 can be calculated based on the values $x^{(n-1)}$ of the nodes 614 of the preceding layer 604 as $$x^{(n)}[i,j]=f(x^{(n-1)}[id_1,jd_2], \ldots ,x^{(n-1)}[id_1+d_1-1,id_2+d_2-1])$$

In other words, by using a pooling layer 606, the number of nodes 614, 616 can be reduced, by replacing a number d1·d2 of neighboring nodes 614 in the preceding layer 604 with a single node 616 being calculated as a function of the values of said number of neighboring nodes in the pooling layer. In particular, the pooling function f can be the max-function, the average or the L2-Norm. In particular, for a pooling layer 606 the weights of the incoming edges are fixed and are not modified by training.

The advantage of using a pooling layer 606 is that the number of nodes 614, 616 and the number of parameters is reduced. This leads to the amount of computation in the network being reduced and to a control of overfitting.

In the embodiment shown in FIG. 6, the pooling layer 606 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 608 can be characterized by the fact that a majority, in particular, all edges between nodes 616 of the previous layer 606 and the nodes 618 of the fully-connected layer 608 are present, and wherein the weight of each of the edges can be adjusted individually.

In this embodiment, the nodes 616 of the preceding layer 606 of the fully-connected layer 608 are displayed both as two-dimensional matrices, and additionally as non-related nodes (indicated as a line of nodes, wherein the number of nodes was reduced for a better presentability). In this embodiment, the number of nodes 618 in the fully connected layer 608 is equal to the number of nodes 616 in the preceding layer 606. Alternatively, the number of nodes 616, 618 can differ.

Furthermore, in this embodiment, the values of the nodes 620 of the output layer 610 are determined by applying the Softmax function onto the values of the nodes 618 of the preceding layer 608. By applying the Softmax function, the sum the values of all nodes 620 of the output layer 610 is 1, and all values of all nodes 620 of the output layer are real numbers between 0 and 1.

A convolutional neural network 600 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 600 can be trained based on the backpropagation algorithm. For preventing overfitting, methods of regularization can be used, e.g. dropout of nodes 612-620, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1. Certain steps or functions of the methods and workflows described herein, including one or more of the steps or functions of FIG. 1, may be performed by a server or by another processor in a network-based cloud-computing system. Certain steps or functions of the methods and workflows described herein, including one or more of the steps of FIG. 1, may be performed by a client computer in a network-based cloud computing system. The steps or functions of the methods and workflows described herein, including one or more of the steps of FIG. 1, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
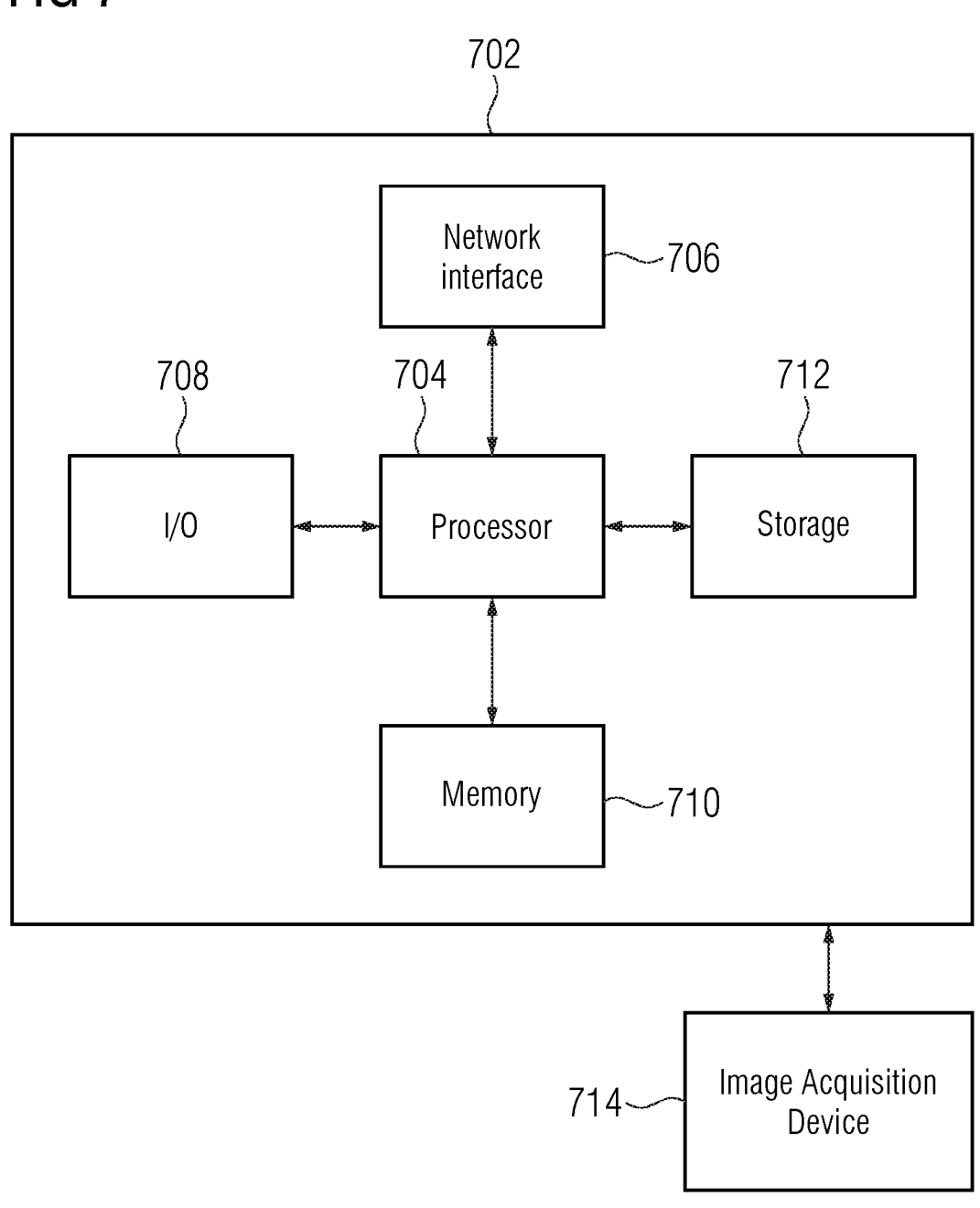
FIG. 7 shows a high-level block diagram of a computer that may be used to implement one or more embodiments.

A high-level block diagram of an example computer 702 that may be used to implement systems, apparatus, and methods described herein is depicted in FIG. 7. Computer 702 includes a processor 704 operatively coupled to a data storage device 712 and a memory 710. Processor 704 controls the overall operation of computer 702 by executing computer program instructions that define such operations. The computer program instructions may be stored in data storage device 712, or other computer readable medium, and loaded into memory 710 when execution of the computer program instructions is desired. Thus, the method and workflow steps or functions of FIG. 1 can be defined by the computer program instructions stored in memory 710 and/or data storage device 712 and controlled by processor 704 executing the computer program instructions. For example, the computer program instructions can be implemented as computer executable code programmed by one skilled in the art to perform the method and workflow steps or functions of FIG. 1. Accordingly, by executing the computer program instructions, the processor 704 executes the method and workflow steps or functions of FIG. 1. Computer 702 may also include one or more network interfaces 706 for communicating with other devices via a network. Computer 702 may also include one or more input/output devices 708 that enable user interaction with computer 702 (e.g., display, keyboard, mouse, speakers, buttons, etc.).

Processor 704 may include both general and special purpose microprocessors, and may be the sole processor or one of multiple processors of computer 702. Processor 704 may include one or more central processing units (CPUs), for example. Processor 704, data storage device 712, and/or memory 710 may include, be supplemented by, or incorporated in, one or more application-specific integrated circuits (ASICs) and/or one or more field programmable gate arrays (FPGAs).

Data storage device 712 and memory 710 each include a tangible non-transitory computer readable storage medium. Data storage device 712, and memory 710, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 708 may include peripherals, such as a printer, scanner, display screen, etc. For example, input/output devices 708 may include a display device such as a cathode ray tube (CRT) or liquid crystal display (LCD)

monitor for displaying information to the user, a keyboard, and a pointing device such as a mouse or a trackball by which the user can provide input to computer 702.

An image acquisition device 714 can be connected to the computer 702 to input image data (e.g., medical images) to the computer 702. It is possible to implement the image acquisition device 714 and the computer 702 as one device. It is also possible that the image acquisition device 714 and the computer 702 communicate wirelessly through a network. In a possible embodiment, the computer 702 can be located remotely with respect to the image acquisition device 714.

Any or all of the systems and apparatus discussed herein may be implemented using one or more computers such as computer 702.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising:
receiving a plurality of 3D (three dimensional) patches extracted from a 3D input medical image;
extracting a set of local features from each of the plurality of 3D patches using a machine learning based local feature extractor network;
reconstructing, using a machine learning based decoder network, the sets of local features output by a bottleneck layer of the machine learning based feature extractor network;
determining global features representing relationships between the sets of local features;
hierarchically combining the global features with the reconstructed sets of local features at a plurality of scales;
performing a medical imaging analysis task on the 3D input medical image based on the hierarchical combination of the global features and the decoded sets of local features; and
outputting results of the medical imaging analysis task.

2. The computer-implemented method of claim 1, wherein the plurality of 3D patches is of a fixed resolution and a fixed field-of-view.

3. The computer-implemented method of claim 1, wherein determining global features representing relationships between the sets of local features comprises:
encoding the sets of local features with positional information; and
determining the global features based on the positional information.

4. The computer-implemented method of claim 3, wherein the positional information comprises pairwise positional relationships between the sets of local features.

5. The computer-implemented method of claim 1, wherein performing a medical imaging analysis task on the 3D input medical image based on the hierarchical combination of the global features and the decoded sets of local features comprises:

performing a segmentation task based on the hierarchical combination of the global features and the decoded sets of local features.

6. The computer-implemented method of claim 1, wherein the medical imaging analysis task comprises one of classification, detection, or segmentation.

7. The computer-implemented method of claim 1, wherein the local feature extractor network is trained with self-supervised learning.

8. The computer-implemented method of claim 1, wherein the 3D input medical image depicts a brain of a patient.

9. An apparatus comprising:

means for receiving a plurality of 3D (three dimensional) patches extracted from a 3D input medical image;

means for extracting a set of local features from each of the plurality of 3D patches using a machine learning based local feature extractor network;

means for reconstructing, using a machine learning based decoder network, the sets of local features output by a bottleneck layer of the machine learning based feature extractor network;

means for determining global features representing relationships between the sets of local features;

means for hierarchically combining the global features with the reconstructed sets of local features at a plurality of scales;

means for performing a medical imaging analysis task on the 3D input medical image based on the hierarchical combination of the global features and the decoded sets of local features; and means for outputting results of the medical imaging analysis task.

10. The apparatus of claim 9, wherein the plurality of 3D patches is of a fixed resolution and a fixed field-of-view.

11. The apparatus of claim 9, wherein the means for determining global features representing relationships between the sets of local features comprises:

means for encoding the sets of local features with positional information; and means for determining the global features based on the positional information.

12. The apparatus of claim 11, wherein the positional information comprises pairwise positional relationships between the sets of local features.

13. A non-transitory computer readable medium storing computer program instructions, the computer program instructions when executed by a processor cause the processor to perform operations comprising:

receiving a plurality of 3D (three dimensional) patches extracted from a 3D input medical image;

extracting a set of local features from each of the plurality of 3D patches using a machine learning based local feature extractor network;

reconstructing, using a machine learning based decoder network, the sets of local features output by a bottleneck layer of the machine learning based feature extractor network;

determining global features representing relationships between the sets of local features;

hierarchically combining the global features with the reconstructed sets of local features at a plurality of scales;

performing a medical imaging analysis task on the 3D input medical image based on the hierarchical combination of the global features and the decoded sets of local features; and outputting results of the medical imaging analysis task.

14. The non-transitory computer readable medium of claim 13, wherein the plurality of 3D patches is of a fixed resolution and a fixed field-of-view.

15. The non-transitory computer readable medium of claim 13, wherein performing a medical imaging analysis task on the 3D input medical image based on the hierarchical combination of the global features and the decoded sets of local features comprises:

performing a segmentation task based on the hierarchical combination of the global features and the decoded sets of local features.

16. The non-transitory computer readable medium of claim 13, wherein the medical imaging analysis task comprises one of classification, detection, or segmentation.

17. The non-transitory computer readable medium of claim 13, wherein the local feature extractor network is trained with self-supervised learning.

18. The non-transitory computer readable medium of claim 13, wherein the 3D input medical image depicts a brain of a patient.

* * * * *